United States Patent
Patel et al.

(10) Patent No.: US 10,719,629 B1
(45) Date of Patent: *Jul. 21, 2020

(54) STRATEGY BASED FEATURE DISABLEMENT

(71) Applicant: Wells Fargo Bank, N.A., San Francisco, CA (US)

(72) Inventors: Himanshu G. Patel, Fremont, CA (US); Bhanu Sankaran, Fremont, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 81 days.

This patent is subject to a terminal disclaimer.

(21) Appl. No.: 16/128,061

(22) Filed: Sep. 11, 2018

Related U.S. Application Data (63) Continuation of application No. 14/706,609, filed on May 7, 2015, now Pat. No. 10,083,323.

(60) Provisional application No. 62/098,909, filed on Dec. 31, 2014.

(51) Int. Cl.
| | | |
|---|---|---|
| G06F 7/04 | (2006.01) | |
| G06F 21/62 | (2013.01) | |
| G06F 9/54 | (2006.01) | |
| G06Q 40/02 | (2012.01) | |
| G06F 8/65 | (2018.01) | |

(52) U.S. Cl.
CPC .............. *G06F 21/629* (2013.01); *G06F 8/65* (2013.01); *G06F 9/54* (2013.01); *G06Q 40/02* (2013.01)

(58) Field of Classification Search
None
See application file for complete search history.

(56) References Cited

U.S. PATENT DOCUMENTS

| | | |
|---|---|---|
| 6,311,321 B1 | 10/2001 | Agnihotri et al. |
| 6,460,089 B1 | 10/2002 | Romano et al. |
| 6,487,594 B1 | 11/2002 | Bahlmann |
| 6,892,234 B2 | 5/2005 | Knight |
| 7,340,726 B1 * | 3/2008 | Chelf .................. G06F 8/71 714/38.12 |
| 7,409,463 B2 | 8/2008 | Ramachandran |
| 7,895,572 B2 | 2/2011 | Stienhans |
| 8,024,743 B2 | 9/2011 | Werner |
| 8,239,851 B2 | 8/2012 | Laicher et al. |
| 8,370,924 B2 | 2/2013 | Mason et al. |
| 8,473,743 B2 | 6/2013 | Freedman et al. |
| 8,474,015 B2 | 6/2013 | Jaber et al. |
| 8,556,713 B2 | 10/2013 | Pilip |
| 8,620,819 B2 | 12/2013 | Walker et al. |
| 8,656,508 B2 | 2/2014 | King et al. |

(Continued)

*Primary Examiner* — Kenny S Lin
(74) *Attorney, Agent, or Firm* — Walter Haverfield LLP; James J. Pingor (57) ABSTRACT

Provided is a strategy based feature disablement that includes determining a device/browser combination based on an indication that a user device is attempting to access a resource. The device/browser combination is compared to a database of device/browser combinations. Access to the resource is allowed based on a determination that the device/browser combination is not included in the database of device/browser combinations. Alternatively, the resource is reconfigured based on a determination that the device/browser combination is included in the database of device/browser combinations.

20 Claims, 9 Drawing Sheets

(56) References Cited

U.S. PATENT DOCUMENTS

| | | | |
|---|---|---|---|
| 8,730,847 B1* | 5/2014 | Carino | H04L 12/1818 |
| | | | 370/260 |
| 10,083,323 B1* | 9/2018 | Patel | G06F 9/44536 |
| 2003/0115311 A1 | 6/2003 | Johnston-Watt et al. | |
| 2005/0131868 A1* | 6/2005 | Lin | G06F 16/9535 |
| 2006/0235960 A1* | 10/2006 | Lai | G06Q 30/02 |
| | | | 709/224 |
| 2007/0250831 A1 | 10/2007 | Spotswood | |
| 2008/0147575 A1* | 6/2008 | Roy | G06F 16/35 |
| | | | 706/12 |
| 2009/0055157 A1 | 2/2009 | Soffer | |
| 2009/0124198 A1* | 5/2009 | Huynh | H04W 48/02 |
| | | | 455/26.1 |
| 2011/0246457 A1* | 10/2011 | Dong | G06Q 10/06 |
| | | | 707/725 |
| 2011/0252360 A1 | 10/2011 | Wheeler et al. | |
| 2012/0131467 A1 | 5/2012 | Kemmler et al. | |
| 2013/0061307 A1* | 3/2013 | Livne | H04W 12/06 |
| | | | 726/7 |
| 2013/0103816 A1 | 4/2013 | Morley | |
| 2013/0298185 A1 | 11/2013 | Koneru et al. | |
| 2014/0018129 A1* | 1/2014 | Baldini | H04M 7/0012 |
| | | | 455/557 |
| 2014/0020072 A1* | 1/2014 | Thomas | H04L 67/10 |
| | | | 726/7 |
| 2014/0095874 A1* | 4/2014 | Desai | H04L 63/0815 |
| | | | 713/168 |
| 2014/0297636 A1 | 10/2014 | Kitajima et al. | |
| 2014/0372230 A1* | 12/2014 | Ray | G06Q 30/0254 |
| | | | 705/14.71 |
| 2015/0033266 A1* | 1/2015 | Klappert | H04N 21/4852 |
| | | | 725/52 |
| 2017/0026420 A1* | 1/2017 | Balacheff | G06Q 10/06 |

* cited by examiner

| | |
|---|---|
| RULE_ID | 10 |
| BLOCK_REQUEST_TYPE | URI |
| BLOCK_REQUEST_VALUE | /esop/doc/mobile/savePrintConfirmationHtml |
| DEVICE_TYPE | Mobile |
| DEVICE_CAPABILITY | ENHANCED |
| DEVICE_NAME | |
| OS_NAME | Windows |
| OS_VERSION | |
| BROWSER_NAME | |
| BROWSER_VERSION | |
| USER_AGENT | |
| PRODUCT_CODE | PT00206008 |

STRATEGY BASED FEATURE DISABLEMENT

CROSS REFERENCE

This application is a continuation of pending U.S. patent application Ser. No. 14/706,609 filed on May 7, 2015, and entitled "STRATEGY BASED FEATURE DISABLEMENT", which claims priority to U.S. Provisional Application Ser. No. 62/098,909, filed Dec. 31, 2014, and entitled "SOFTWARE VERSIONING AND STRATEGY BASED FEATURE DISABLEMENT," the entireties of which are expressly incorporated herein by reference.

BACKGROUND

Online banking provides customers with the ability to interact with their bank on their own schedule, providing convenient access to a range of banking services. Integrated business functionality across many enterprise application platforms is being introduced at a record pace. At the same time, technology ecosystem has become increasingly more complex as a result of smart device proliferation.

The ability to finely control the enablement (or disablement) of these business functions across all these platforms is cumbersome, complex, and prone to manual errors when coordinating all the systems involved. Additionally, there may be a high cost associated with such management.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to system that includes a processor that executes computer executable components stored in a memory. The computer executable components may include a configuration component that determines a device type and browser type for a user device attempting to access one or more applications or features supported by the system. The computer executable components may also include a mapping component that cross-references the device type with the browser type and saves a combination of the device type and browser type as a device/browser combination. Further, the computer executable components may include a management component that maintains a listing of blocking groups and selectively performs functional blocking or uniform resource identifier based blocking as a function of the device/browser combination and the one or more applications or features attempting to be accessed.

Another aspect relates to a method that may include determining, by a system comprising a processor, a device/browser combination based on an indication that a user device is attempting to access a resource. The method may also include comparing, by the system, the device/browser combination to a database of device/browser combinations. Further, the method may include performing, by the system, one of the following: allowing access to the resource based on a determination that the device/browser combination is not included in the database of device/browser combinations, or reconfiguring the resource based on a determination that the device/browser combination is included in the database of device/browser combinations.

Yet another aspect relates to a computer-readable storage device storing executable instructions that, in response to execution, cause a system comprising a processor to perform operations. The operations may include determining a device type and browser type for a user device attempting to access one or more applications or features supported by the system. The operations may also include establishing a combination based on a mapping between the device type and the browser type and retaining the combination as a device/browser combination. Further, the operations may include selectively performing functional blocking or uniform resource identifier based blocking as a function of the device/browser combination and the one or more applications or features attempting to be accessed.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Figure 1:
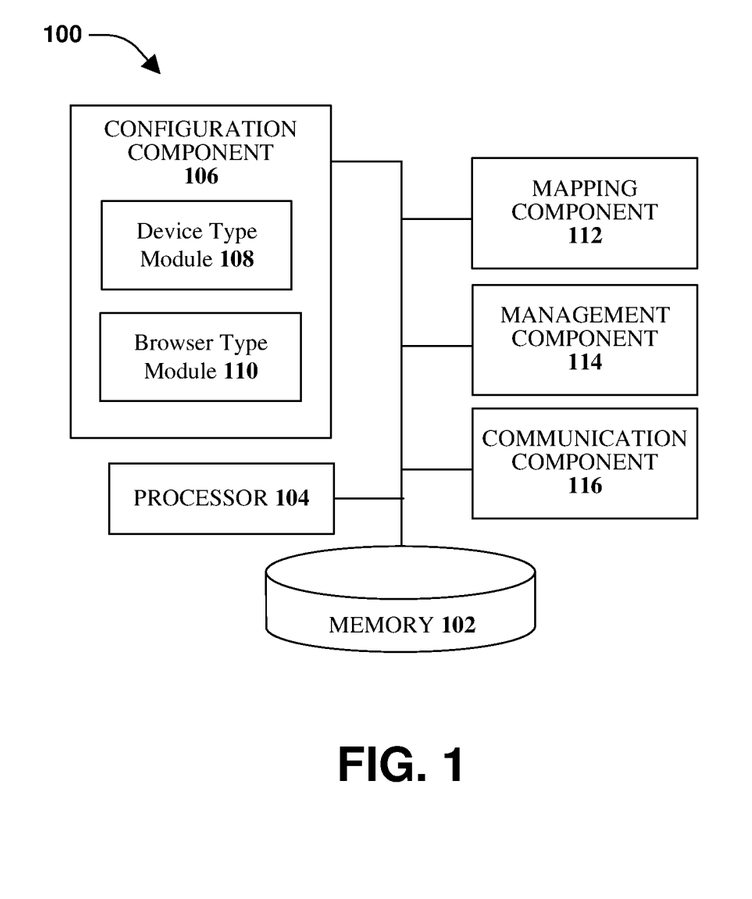
FIG. 1 illustrates an example, non-limiting implementation of a system configured for strategy based feature disablement, according to an implementation.

FIG. 1 illustrates an example, non-limiting implementation of a system 100 configured for strategy based feature disablement, according to an implementation. Strategy based feature disablement refers to selective blocking of a feature, a Uniform Resource Identifier (URI), or combinations thereof, for different device parameter combinations. According to an implementation, the strategy based feature disablement may include a set of java classes, configuration files, and/or database tables that enable the feature blocking. In an example, a code (e.g., a special code) may be inserted in a few rows in a database, wherein the code indicates whether the feature should be blocked or not blocked for a particular device, browser, or device and browser combination. In an example, device parameters that may be used in combinations to block features and/or URIs include device types (e.g., tablets, desktops, mobile devices, and so on), device Name (e.g., iPhone 5S, Samsung Galaxy S3, and so on), and browsers (e.g., Android Native browser, Chrome, and so on). The strategy based feature disablement allows changes to the database, for example, instead of adding device specific checks in a base code, which would have to be removed at a later date. Further, adding device specific checks in the base code makes it difficult to maintain the base code.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the memory 102.

Also included in the system 100 may be a configuration component 106 that may be configured to ascertain various information related to a device, a browser, or other parameters associated with a user experience. For example, the configuration component 106 may include a device type module 108 that may be configured to determine a type of device that is attempting to access a certain feature or a certain application. A browser type module 110 may be configured to determine a type of browser used by the device. The type of device, browser type, and/or various other input fields may be determined by receiving information from the device, requesting information from the device, or based on other communications. For example, one or more input fields may indicate the device type and/or the browser type.

Based on the device type, browser type, or other information, a mapping component 112 may be configured to map the device and browser combinations to blocking groups maintained by a management component 114.

For example, to access on-line or web-based services or other electronic or computer-based services, mobile devices are commonly used. There are many different types of mobile devices and many different types of browsers, resulting in a large number of device type and browser type combinations. This large number of combinations may increase the amount of complexity for web-based application features. Further, html file support may not be complete on all browsers and/or all device types. Therefore, due to these many different devices, there is a need to provide a good experience on certain browsers/device combinations to allow for a graceful integration of the functionality. In addition, there may be legal and regulatory compliance requirements (e.g., viewing of a pdf application on an identified device type within a pdf reader).

Due to these different combinations and/or compliance requirements, at times there may be various issues encountered that cause dissatisfaction from a user experience perspective. For example, in some situations, a display of form fields might not populate correctly and/or drop downs may not look correct. Further, there may be legal and compliance issues where a functionality needs to be blocked, at least temporarily, until there is a fix from a previous generation (if there is a fix).

In these types of situations, the management component 114 may be configured to block a certain feature and/or provide a better user experience for that feature, which may be performed without making code changes. Further, since the device/browser combinations that have issues related to features that need to be blocked and/or corrected might relate to a limited portion of the end user population. Therefore, a larger portion of the end user population might not be affected. However, due to the limited portion of end users that might experience problems, it may prevent rolling out a feature or functionality of the project for the larger portion of end users.

For example, if a user is using a smart phone that is running an old version of the smart phone operating system, the smart phone might not be able to upload a document. However, other smart phones that are running the newest version of the smart phone operating system may upload the document correctly. Thus, it might not be acceptable to block everyone using the smart phone from uploading the document. Thus, management component 114 may just block the upload of the document for that specific version of the smart phone operating system because that operating system is old. Further, a communication component 116 may be configured to provide information to the user of the particular smart phone indicating that the currently running smart phone operating system (e.g., the old operating system) is not supported.

Figure 2:
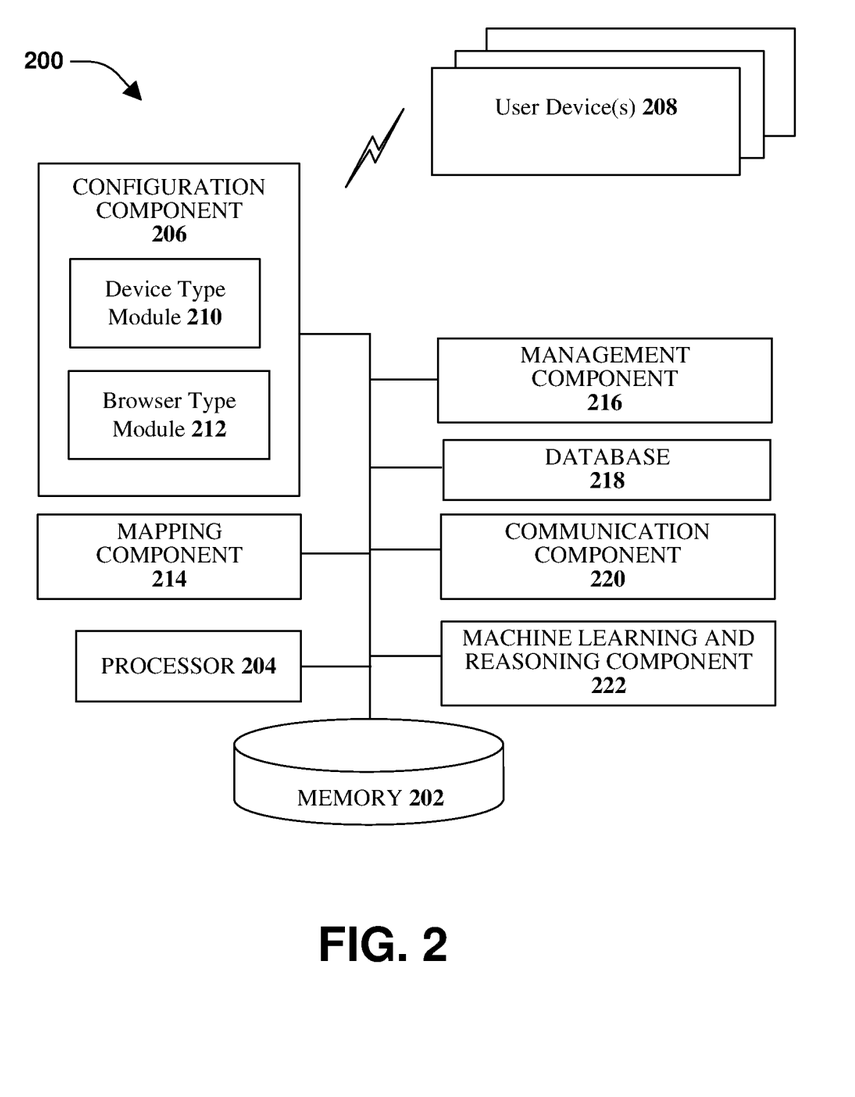
FIG. 2 illustrates another example, non-limiting system configured for feature disablement, according to an aspect.

FIG. 2 illustrates another example, non-limiting system 200 configured for feature disablement, according to an aspect. The abundance and changing nature of device type and browser combinations has added testing complexity to features of web applications. For example, application features might not adhere to expected behavior due to device type/browser idiosyncrasies. Further, there might be a need to provide an alternative experience on certain browser/device combinations to allow for graceful degradation of user facing functionality.

In some cases, legal and regulatory compliance needs may warrant a quick turnaround time for blocking certain application features to mitigate user dissatisfaction, avoid risks, and incur minimal costs. However, adding device/browser combination specific checks may hamper code maintainability. Further, post-production fixes may require exception deployments and regression testing, leading to increased cost and effort. In addition, the small population of the affected customer base may hamper "time to market" service level agreements (SLAs) for the majority of users.

The various aspects discussed herein provide a solution that does not require code changes and application deployment. Further, the disclosed aspects provide an application agnostic, service-based implementation that promotes reusability. Further, the disclosed aspects address a problem specific to certain device/browser combinations and change the normal operation of how (and what) data is conveyed to devices that fall within those certain device/browser combinations.

The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the memory 202.

A configuration component 206 may be configured to determine a device type and browser combination for a user device 208 that is attempting to access one or more applications or features supported by the system 200 (or supported by another system). Although the disclosed aspects may be described with respect to a single user device, in some implementations, multiple user devices may be attempting to access one or more applications at about the same time or at different times, wherein the system 200 is configured to handle the processing for the multiple user devices.

The configuration component 206 performs the determination in a non-intrusive manner and does not require multiple code checks. Therefore, no conditional statements in code are necessary. Conditional statements in the code may make the code more fragmented and maintainability may become a long-term problem with conditional checks that are specific to device types and router combinations (especially where these combinations may change frequently).

For example, a device type module 210 may determine a device type based on information received from the user device or from information selectively requested from the user device. A browser type module 212 may be configured to determine the browser being utilized by the user device.

A mapping component 214 may be configured to correspond the device type with the browser type and save the configuration as a device/browser combination (e.g., based on application specific interceptors). The device/browser combination information is provided to a management component 216 that may be configured to maintain a listing of blocking groups. For example, each blocking group in the listing of blocking groups may be a unique device/browser combination or pair.

The blocking group information may be maintained in a database 218. For example, the database 218 may include a table that stores device and browser information. The database 218 may be a component separate from the management component 216 and/or the memory 202. However, according to some implementations, the database 218 may be included, at least in part, in the management component 216 and/or the memory 202. According to some implementations, the database 218 may be a relational database management system (RDBMS). The RDBMS may include a configurable list (e.g., black list) of features or URIs that should be blocked and/or an alternative experience should be provided. Further, the database 218 may be associated with a shared service and/or a reusable strategy service, wherein the management component 216 may retrieve the blocking rules from the database 218 and cache the rules in the application. According to some implementations, application interceptors may map the device/browser combinations to blocking rules retrieved by the strategy service.

The management component 216 may perform functional blocking and/or URI based blocking. Such blocking may be performed as a function of the device/browser combination and the applications or features attempting to be accessed. Functional blocking may be performed when a certain functionality should be blocked on a device/browser combination. URI based blocking may be performed by the management component 216 when access to a particular uniform resource locator (URL) needs to be prevented. According to some implementations, based on a rule (or set of rules) associated with the functional blocking or the URI blocking, the management component 216 may selectively allow access to one or more features, disable one or more features, and/or alter one or more features.

According to some implementations, automated learning may be employed to facilitate one or more of the disclosed aspects. For example, a machine learning and reasoning component 222 may be utilized to automate one or more of the disclosed aspects. The machine learning and reasoning component may employ automated learning and reasoning procedures (e.g., the use of explicitly and/or implicitly trained statistical classifiers) in connection with selective blocking of a feature, a Uniform Resource Identifier (URI), or combinations thereof, for different device parameter combinations in accordance with one or more aspects described herein.

For example, the machine learning and reasoning component may employ principles of probabilistic and decision theoretic inference. Additionally or alternatively, the machine learning and reasoning component may rely on predictive models constructed using machine learning and/or automated learning procedures. Logic-centric inference may also be employed separately or in conjunction with probabilistic methods.

The machine learning and reasoning component 222 may infer various parameters related to a device, a browser or other parameters related to a user experience. The machine learning and reasoning component 222 may also infer whether certain features should be blocked or other actions should be taken based on a device/browser combination or based on other criteria.

As used herein, the term "inference" refers generally to the process of reasoning about or inferring states of the system, a component, a module, the environment, and/or mobile devices from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection disabling or enabling one or more features, and so forth) may employ various artificial intelligence-based schemes for carrying out various aspects thereof. For example, a process for determining if a particular feature is operating as expected or not operating as expected may be enabled through an automatic classifier system and process.

A classifier is a function that maps an input attribute vector, $x=(x1, x2, x3, x4, xn)$, to a confidence that the input belongs to a class. In other words, f(x)=confidence(class). Such classification may employ a probabilistic and/or statistical-based analysis (e.g., factoring into the analysis utilities and costs) to prognose or infer an action that should be employed to determine which features to implement, which features to disable, which features to change, and so forth.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing various transaction logs, by receiving extrinsic information, and so on). For example, SVM's may be configured through a learning or training phase within a classifier constructor and feature selection module. Thus, a classifier (s) may be used to automatically learn and perform a number of functions, including but not limited to determining according to a predetermined criteria when to implement a feature, when to disable a feature, problems associated with a device/browser combination, and so forth. The criteria may include, but is not limited to, similar device/browser combinations, historical information, and so forth.

Additionally or alternatively, an implementation scheme (e.g., a rule, a policy, and so on) may be applied to control and/or regulate feature implementation, feature changes or updates, and so forth. In some implementations, based upon a predefined criterion, the rules-based implementation may automatically and/or dynamically implement features or changes to the features, disable one or more features, and so on. In response thereto, the rule-based implementation may automatically interpret and carry out functions associated with the features based on device/browser combinations by employing a predefined and/or programmed rule(s) based upon any desired criteria.

Figure 3:
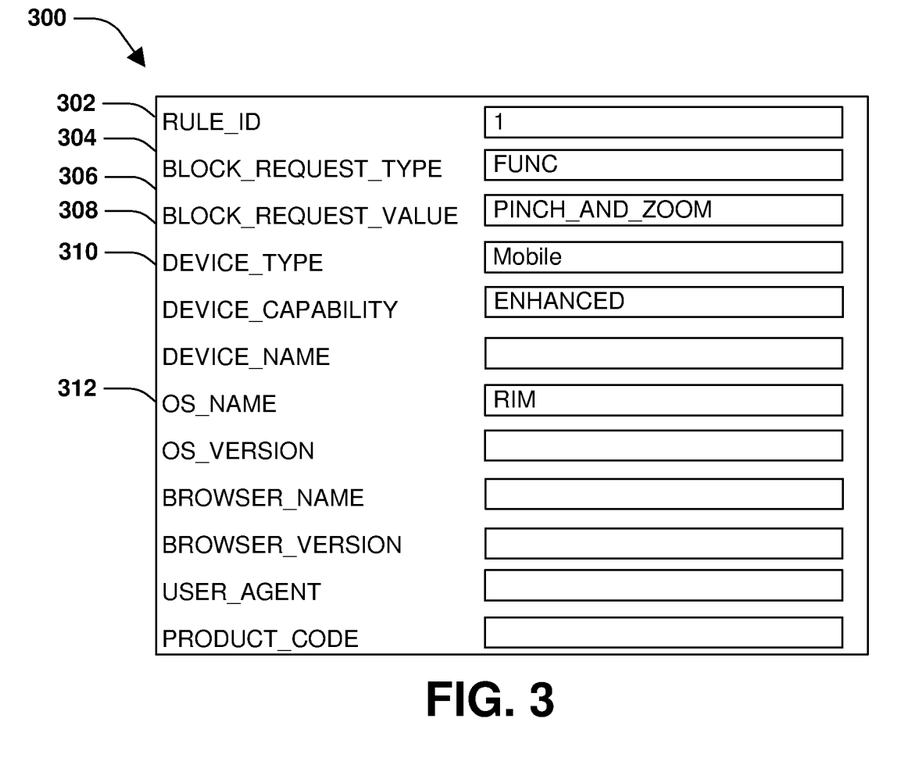
FIG. 3 illustrates an example, non-limiting implementation of functional blocking rules, according to an aspect.

FIG. 3 illustrates an example, non-limiting implementation 300 of functional blocking rules, according to an aspect. A rule identifier 302 may be established in order to distinguish each of the rules. The rule identifier 302 may be numerical, as illustrated, or might consists of other types of characters. Further, a block request type 304 is indicated, which in this case is functional blocking. The block request value 306 in this example relates to pinch and zoom; however, other functions or features might be used for this value. A device type 308 indicates the type of device that is to be blocked, as well as the device capability 310 information. The operating system name 312 is also identified. Other information may also be provided and includes, but is not limited to, device name, operating system version, browser name, browser version, and user agent.

In an example, it is common to send images on devices, however, on certain devices, the zoom (or pinch) might not work well. Thus, the zoom and pinch might be blocked for just those certain devices and/or an alternative experience may be provided. An alternative experience may be to allow the end user to scroll the image. In another example, an alternative experience may be to allow the end user to pan and zoom the image, instead of pinching and zooming the image.

Figure 4:
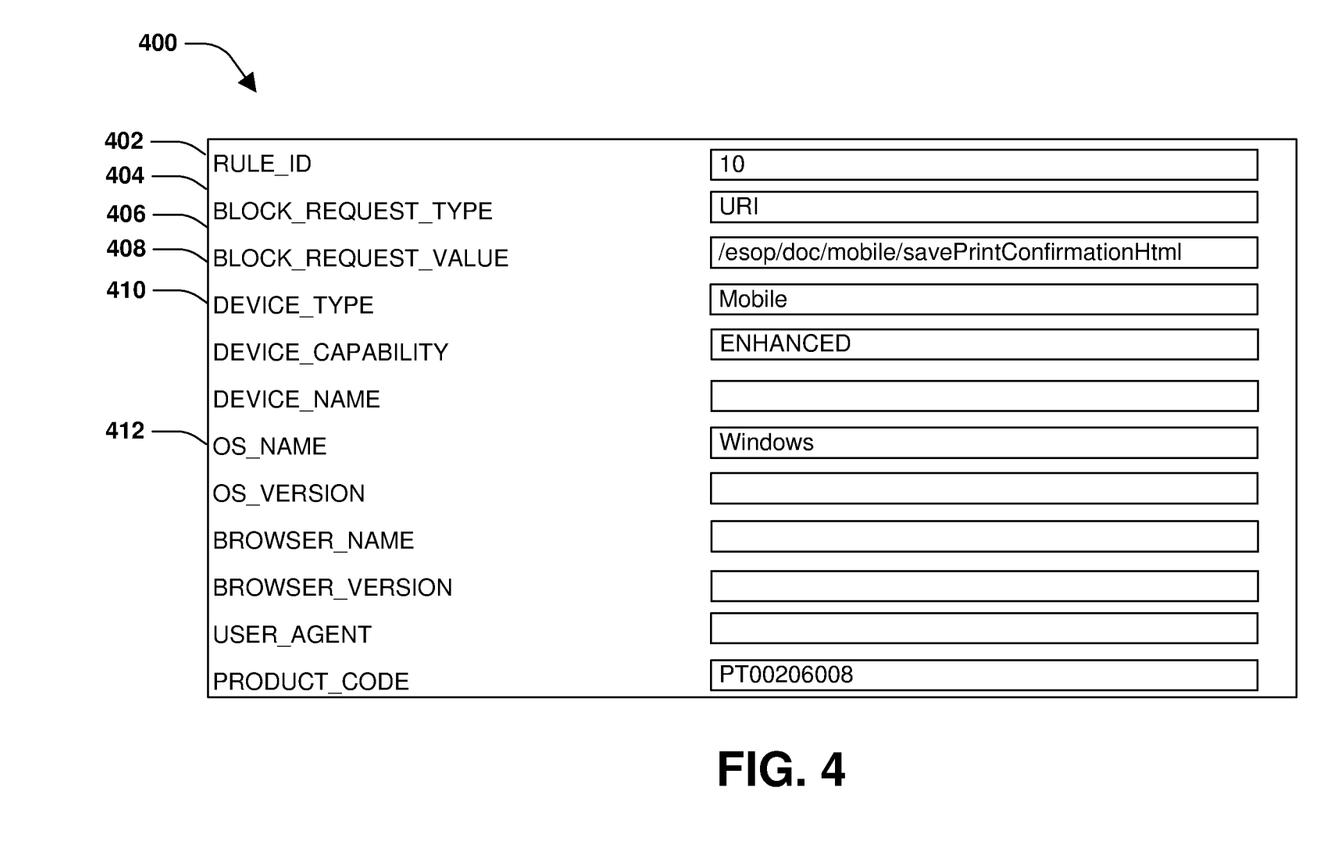
FIG. 4 illustrates an example, non-limiting implementation of uniform resource identifier based blocking rules, according to an aspect.

FIG. 4 illustrates an example, non-limiting implementation 400 of URI based blocking rules, according to an aspect. For example, sometimes when resources, such as a pdf file, are accessed, there is a URL that maps to the pdf. In some cases, the pdf may not be in conformance with the legal and/or compliance requirements, the form fields may not populate correctly, and/or there may be issues with the pdf. Thus, the pdf may simply be blocked. Further, if the user tries to link to the pdf, since it is known that the URL leads to the pdf, it may be blocked at that point and the user may be presented with a message indicating that the pdf cannot be downloaded by the particular device/browser combination.

Another example of URL blocking is an HTML page. In one case, there is functionality that pertains to disclosure information related to a device and the user may read the disclosure on their device. However, for some reason the viewing of the disclosure might not be appropriate from a legal and/or compliant standpoint or for a user experience standpoint. Therefore, the disclosure may be blocked and a message may be provided the user. The message may indicate, for example, "Sorry your device does not support viewing of disclosures, please login from another device to view the disclosure."

Similar to FIG. 3, a rule identifier 402 may be established in order to distinguish each of the rules. In these examples, the rules are identified in numerical order. However, the disclosed aspects are not limited to this implementation and other manners of identifying the rules may be utilized. A block request type 404 is indicated, which in this case is URI blocking. The block request value 406 in this example relates to save Print Confirmation. A device type 408 indicates the type of device that is to be blocked and the device capability 410 information is also included. The operating system name 412 is also identified. Similar to FIG. 3, other information may also be provided and includes, but is not limited to, device name, operating system version, browser name, browser version, and user agent.

According to an implementation, the following is an example table structure that may be utilized with the sample data models illustrated in FIG. 3 and FIG. 4.

| Name | Type |
| --- | --- |
| RULE_ID | NUMBER(12) |
| BLOCK_REQUEST_TYPE | VARCHAR2(256) |
| BLOCK_REQUEST_VALUE | VARCHAR2(256) |
| DEVICE_TYPE | VARCHAR2(256) |
| DEVICE_CAPABILITY | VARCHAR2(256) |
| DEVICE_NAME | VARCHAR2(256) |
| OS_NAME | VARCHAR2(256) |
| OS_VERSION | VARCHAR2(256) |
| BROWSER_NAME | VARCHAR2(256) |
| BROWSER_VERSION | VARCHAR2(256) |
| USER_AGENT | VARCHAR2(256) |
| PRODUCT_CODE | VARCHAR2(256) |

With continuing reference to FIG. 2, if an application, feature, or function is blocked, the communication component 220 may be configured to convey a message to the user device 208. The message may indicate the application, feature, or function that is blocked (e.g., by name). The message may also indicate the reason for the blocking or might provide other information that may be useful for the end user to understand how to gain the desired access.

In an example use case, data in a "consumer credit agreement" pdf form field was not being populated on devices running operating system "A," when viewed on the default operating system "A" reader (e.g., Exception 1). After Exception 1 was deployed in production, similar issues were observed on devices running operating system "B" using the default reader (e.g., Exception 2). Testing was performed using a commonly available pdf reader that was set as default on the devices running operating system "A" and devices running operating system "B."

Figure 5:
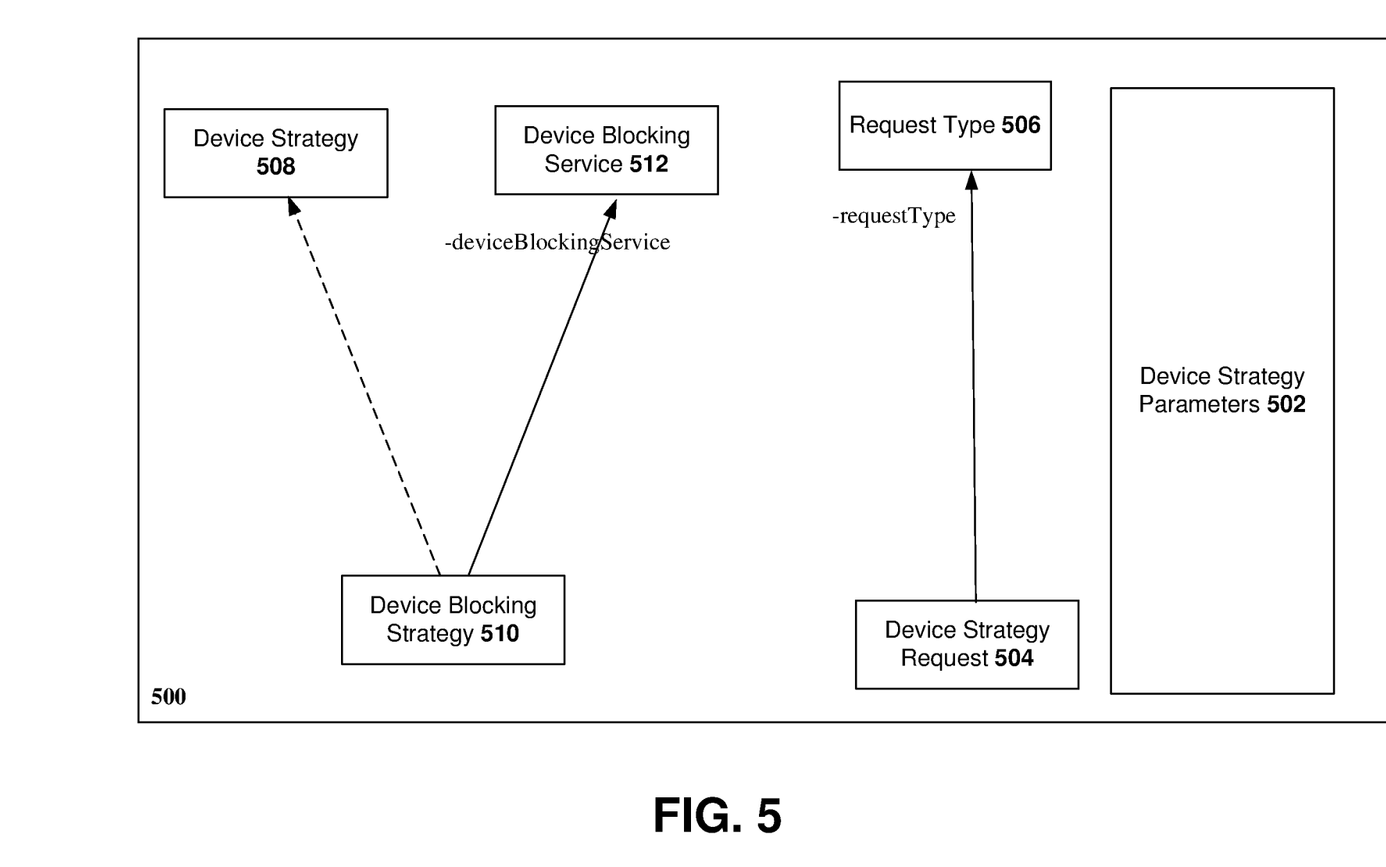
FIG. 5 illustrates an example, non-limiting class diagram for feature disablement, according to an aspect.

The class diagram 500 also includes a device strategy 508, which may be an interface that exposes the blocking strategy for a particular device type. A device blocking strategy 510 may be a class that implements the device strategy for a particular device type based on a device blocking service 512. The device blocking service 512 is a class that retrieves the device parameters and builds a blocking list based on the request type.

According to an implementation, the following is an example, non-limiting implementation for using strategy based feature disablement:

```
// A Device Detection Interceptor that intercepts the first request and determines
  the UI behavior based on a functional or a URI based Strategy
public class DeviceDetectionInterceptor extends HandlerInterceptor Adapter {
@Autowired
private DeviceBlockingStrategy blockingStrategy;
@Override
public boolean preHandle(HttpServletRequest request, Http Servlet Response,
   Object handler) throws IOException {
//Populate DeviceParams using MDK Device Capabilities
private DeviceStrategyParams getDeviceParams(HttpServletRequest request,
   MdkDeviceAdapter mdkDeviceAdapter) {
   Device StrategyParams deviceParams = new DeviceStrategyParams( );
   Device mdkDevice = mdkDeviceAdapter.getMdkDevice( );
   deviceParams.setBrowserName(mdkDevice.getCapability("browserName
"));
   deviceParams.setBrowserVersion(mdkDevice.getCapability("browserVers
ion"));
return deviceParams;
}
//Functional Strategy:
boolean allowDevice =
blockingStrategy.allowDevice(getDeviceRequestTypeForFUNC("PINCH_AND
_ZOOM"), getDeviceParams(request, mdkDeviceAdapter));
//URI Based Strategy
if (!allowDevice(getDeviceStrategyRequest(RequestType.URI,
request.getRequestURI( )),
deviceStrategyParams)) {
response.sendRedirect("/esep/doc/mobile/error? messageId=econsent.mobile.error.
message");
}
```

Continuing the above example, the end users had to be contacted to inform them of the limitations with respect to the "consumer credit agreement" pdf. Further, extensive risk mitigation measures needed to be taken to overcome the noted problems. However, with the disclosed aspects, a simple (although temporary) solution is to disable features on certain device/browser configurations.

FIG. 5 illustrates an example, non-limiting class diagram 500 for feature disablement, according to an aspect. As discussed, a datable table (e.g., T_<application-name>FN_RULES) may store device and browser information. The class diagram 500 includes device strategy parameters 502, which is a class that models the device and browser information. Examples of items included in the device strategy parameters 502 include, but are not limited to agent string, browser name, browser version, browser version operating system, device capability, device name, device type, operating system name, operating system version, operating system version operator, and product type.

Also included in the class diagram 500 is a device strategy request 504, which is a class that stores the mapping between a request type 506 and a request value. The device strategy request 504 may include a request type, and a request value, for example. The request type 506 may be an enumeration that models the blocking strategy type (e.g., functionality based, URI based, and so on). An enumeration (or enum) is a data type that includes a set of named values (e.g., elements, members, or enumerators) of the type.

It is noted that the above is provided for example purposes only and the disclosed aspects are not limited to this implementation.

In practice, strategy based feature disablement may utilize functional blocking to disallow an upload from a particular browser that is below a defined version or revision level (e.g., the browser functionalities or capabilities do not meet or exceed a defined threshold level). For example, a HE customer E-upload project [functional blocking] may be defined as follows:

| | |
|---|---|
| RuleID: | 1 |
| Block_Request_Type | Func |
| Block_Request_Value | Allow_File_Upload |
| Device_Type | Mobile |
| Device_Capability | Enhanced |
| Device_Name | (null) |
| OS_Name | Android |
| OS_Version | (null) |
| Browser_Name | Android Browser |
| Browser_Version | lt 4.0.1 |

Further, the following illustrates an example, non-limiting HM disclosures project [URI based blocking]:

7 URI
/esep/doc/mobile/displayEDeliveryContentHtml
Mobile    ENHANCED (null) Windows -continued

| | | | | |
|---|---|---|---|---|
| 8 URI | /esep/doc/mobile/savePrintConfirmationHtml | | | |
| | Mobile | ENHANCED | (null) | Windows |
| 9 URI | /esep/doc/mobile/displayEDeliveryContentHtml | | | |
| | Mobile | ENHANCED | (null) | Windows |
| 10 URI | /esep/doc/mobile/savePrintConfirmationHtml | | | |
| | Mobile | ENHANCED | (null) | Windows |

Methods that may be implemented in accordance with the disclosed subject matter, will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
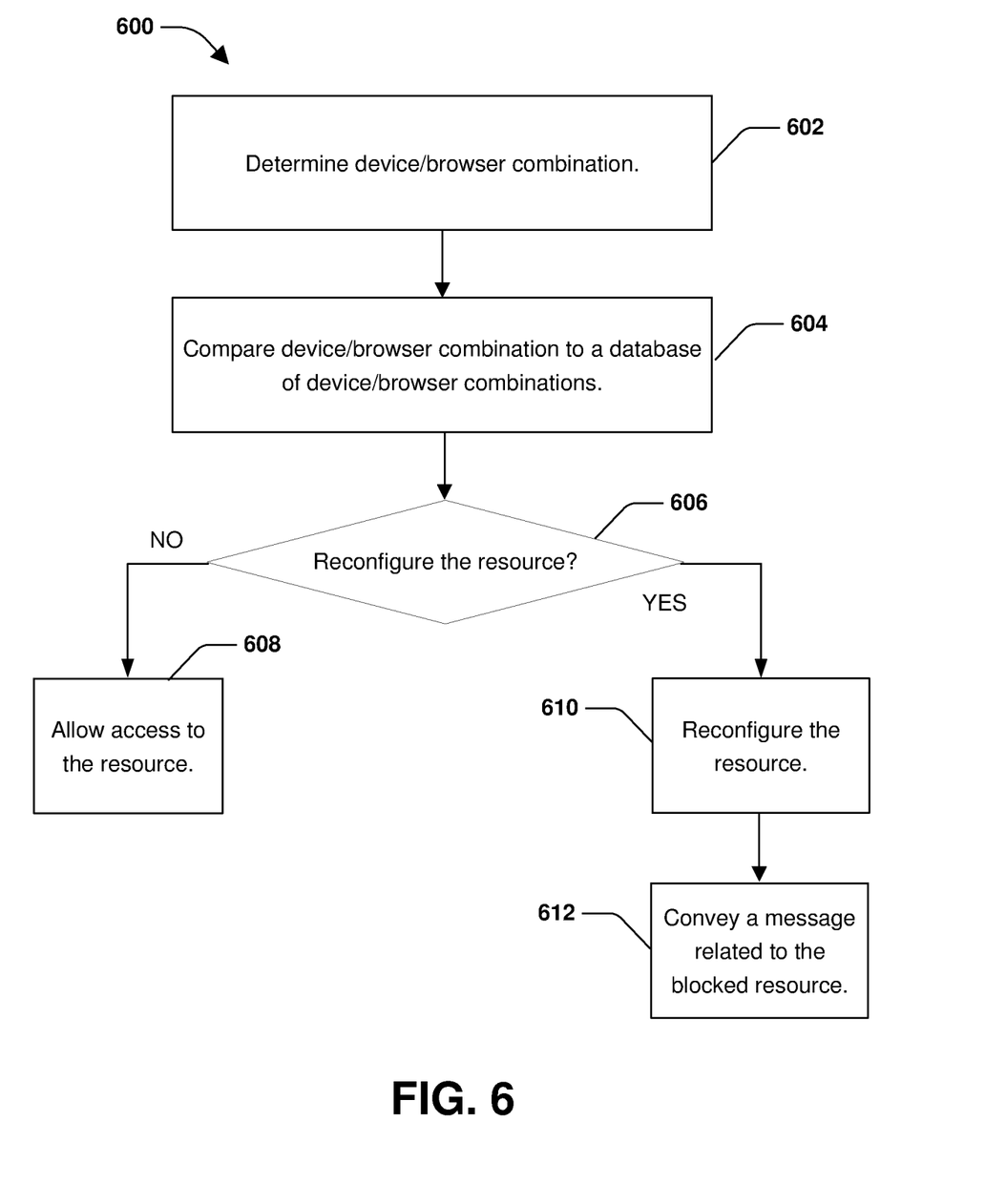
FIG. 6 illustrates an example, non-limiting method for strategy based feature disablement, according to an aspect.

FIG. 6 illustrates an example, non-limiting method 600 for strategy based feature disablement, according to an aspect. As discussed above, as more features are added to mobile devices, the risk of some features not working on some device/browser pairs also increases. It is not possible to test and validate all features for all device/browser pairs each time there is a new revision of the base code. Further, if a large number of if/then exceptions are created in the code for different browser/device pairs, it may create issues. One issue is that the code becomes heavy and is not extensible. Another issue is that if the device or browser manufacturer fixes the problem in a later revision, the code has to be modified to remove the if/then exceptions, which is time consuming.

Further, there could be legal and compliance implications if certain features are not working as desired on certain devices. To adhere to the legal and compliance guidelines, a feature may need to be turned off on a mobile device completely or device specific checks may need to be added in the base code, which would make it very hard to maintain the code. In addition, when high severity device specific issues are discovered in production, exception requests will need to be filed to fix the device specific issues. For example, two exception requests to turn off EFS PDF on a mobile device may need to be issued.

To overcome the above mentioned issues (as well as other issues), the disclosed aspects are configured to block any functionality or URLs by simply making a few code inserts into database tables, which does not require a full blown code release, or require any device specific checks in the code.

For example, a generic implementation comprising a set of java classes, configuration files, and database tables that enable blocking of any feature or URI for different device parameter combinations on a mobile device, regardless of the device type or Operating System may be utilized. Further, the disclosed aspects may eliminate wasted person-hours maintaining code for all possible high severity device specific issues by providing a simple solution that is easily corrected in the database.

The method 600 starts, at 602, when a device/browser combination is determined. The device and/or browser may be determined based on information broadcast by the device attempting to gain access to the application, feature, or other resource. In some implementations, the determination is based on selectively requesting the information from the device or through other manners of obtaining the information.

At 604, the device/browser combination is compared against a database of device/browser combinations. For example, as problems are discovered, the device browser combinations in the database may be appended to include the newly discovered combination. The database may also include a cross-reference to the application, feature, or other resource that does not operate correctly with the device/browser combination.

Based, at least in part, on the information in the database, at 606, a determination is made whether to reconfigure (e.g., disable, allow, alter, and so on) the resource for that device/browser combination. If the determination is to not reconfigure the feature ("NO"), at 608, access to the resource is allowed.

However, if the determination at 606 is that resource should be reconfigured, at 610, the resource is reconfigured (e.g., disabled, modified, and so on) as specified in the database, for example. Additionally, if the resource is disabled, at 612, a message may be conveyed to the device attempting to access the resource. The message may include information related to why the resource was blocked and/or other information that would be useful for the user of the device to determine the status or to determine why the access to the resource is blocked.

In one implementation, the disclosed aspects utilize a stored custom scripting language in a database in conjunction with custom scripted calls with-in the code that allows the code to dynamically alter its path at runtime. The disclosed aspects may be used to dynamically alter code to handle different devices, form factors, browsers, legal and regulatory situations without having to rewrite code or standard methods like tables, maps, if-then-else code, and so on. Further, the disclosed aspect allows the altering of the code execution with a simple database change.

For example, assume Test( ) is an application that needs to be reconfigured (disabled, enabled, or altered). The reconfiguration of the resource may be performed with the following two example, non-limiting custom scripts, namely, script s1 and script s2. The first script s1 may be created upfront and stored in the database. Thus, script s1 is not part of the code Test( ). The database in addition stores various options, configuration parameters, and execution results. The second script s2 is part of Test( ) and it goes to the database, fetches script s1 and execute script s1.

This simple method disables, enables, or alters a code path without rereleasing the code or massive updates/new configuration tables. Further, dynamic reconfiguration may be based on regulatory requirements, financial health, location/context, user characteristics, as well as other parameters.

Figure 7:
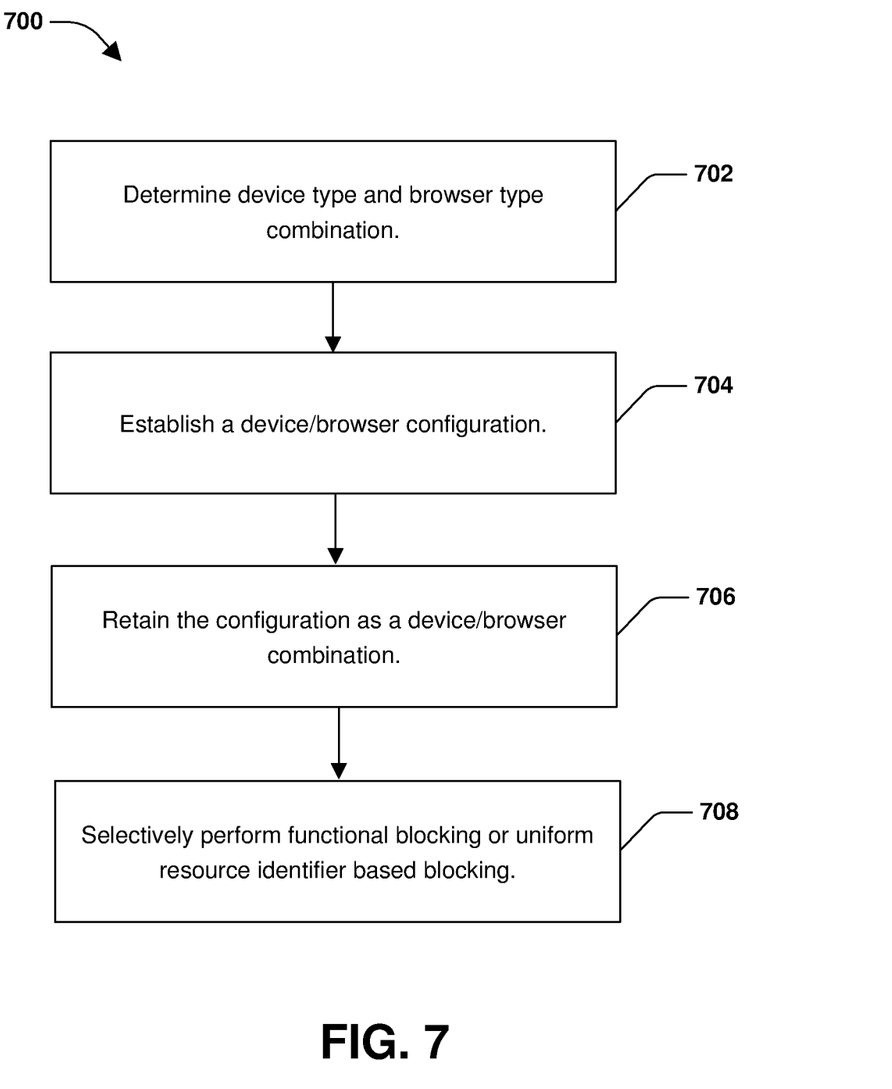
FIG. 7 illustrates an example, non-limiting method for selectively performing functional blocking or uniform resource identifier based blocking, according to an aspect.

FIG. 7 illustrates an example, non-limiting method for selectively performing functional blocking or uniform resource identifier based blocking, according to an aspect. The method starts, at 702, when a device type and browser combination for a user device are determined. The user device is the user device that is attempting to access one or more supported applications or features.

At 704, the device type is mapped with the browser type and a device/browser configuration is established. The configuration is retained as a device/browser combination, at 706. For example, the device/browser combination may be maintained in a database or other storage media.

Functional blocking or uniform resource identifier blocking is selectively performed, at 708. The blocking is performed as a function of the device/browser combination and the applications or features attempting to be accessed.

According to an implementation, the method includes blocking a defined functionality on the device/browser combination based on the functional blocking. According to another implementation, the method includes blocking access to a specific uniform locator based on the uniform resource identifier based blocking.

Figure 8:
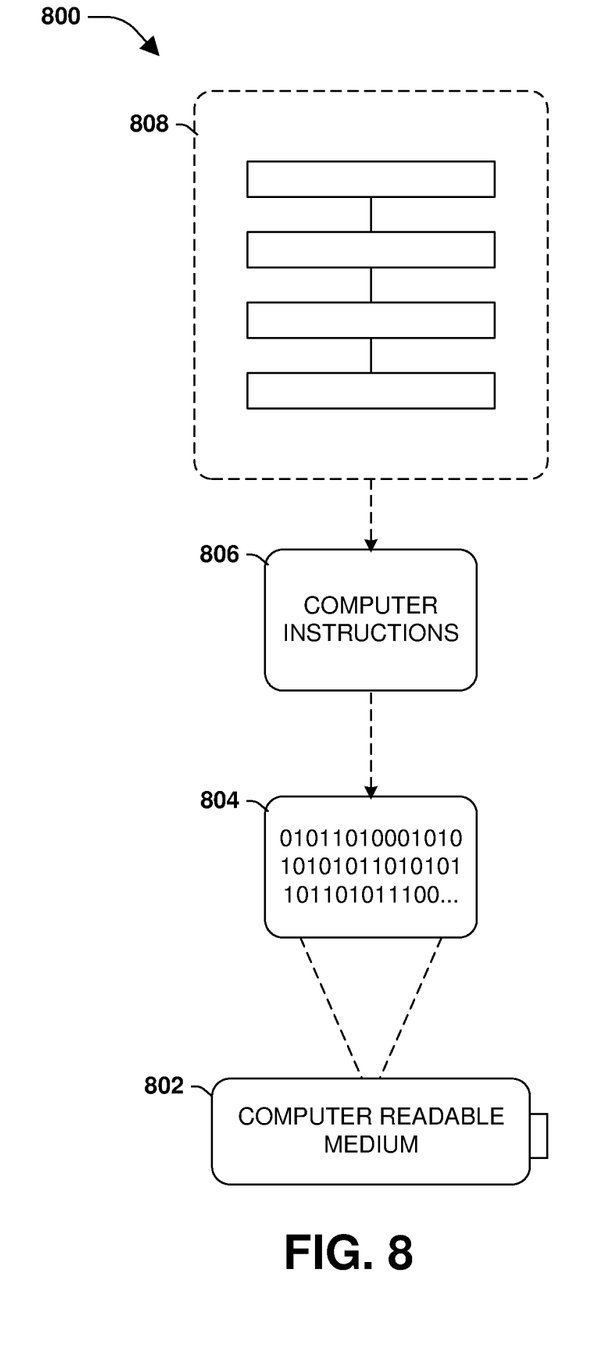
FIG. 8 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, and so forth, on which is encoded computer-readable data 804. The computer-readable data 804, such as binary data including a plurality of zero's and one's as illustrated, in turn includes a set of computer instructions 806 configured to operate according to one or more of the principles set forth herein.

In the illustrated embodiment 800, the processor-executable computer instructions 806 may be configured to perform a method 808, such as the method 1000 of FIG. 10 and/or the method 600 of FIG. 6, for example. In another embodiment, the processor-executable instructions 804 may be configured to implement a system, such as the system 200 of FIG. 2 and/or the system 200 of FIG. 2, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
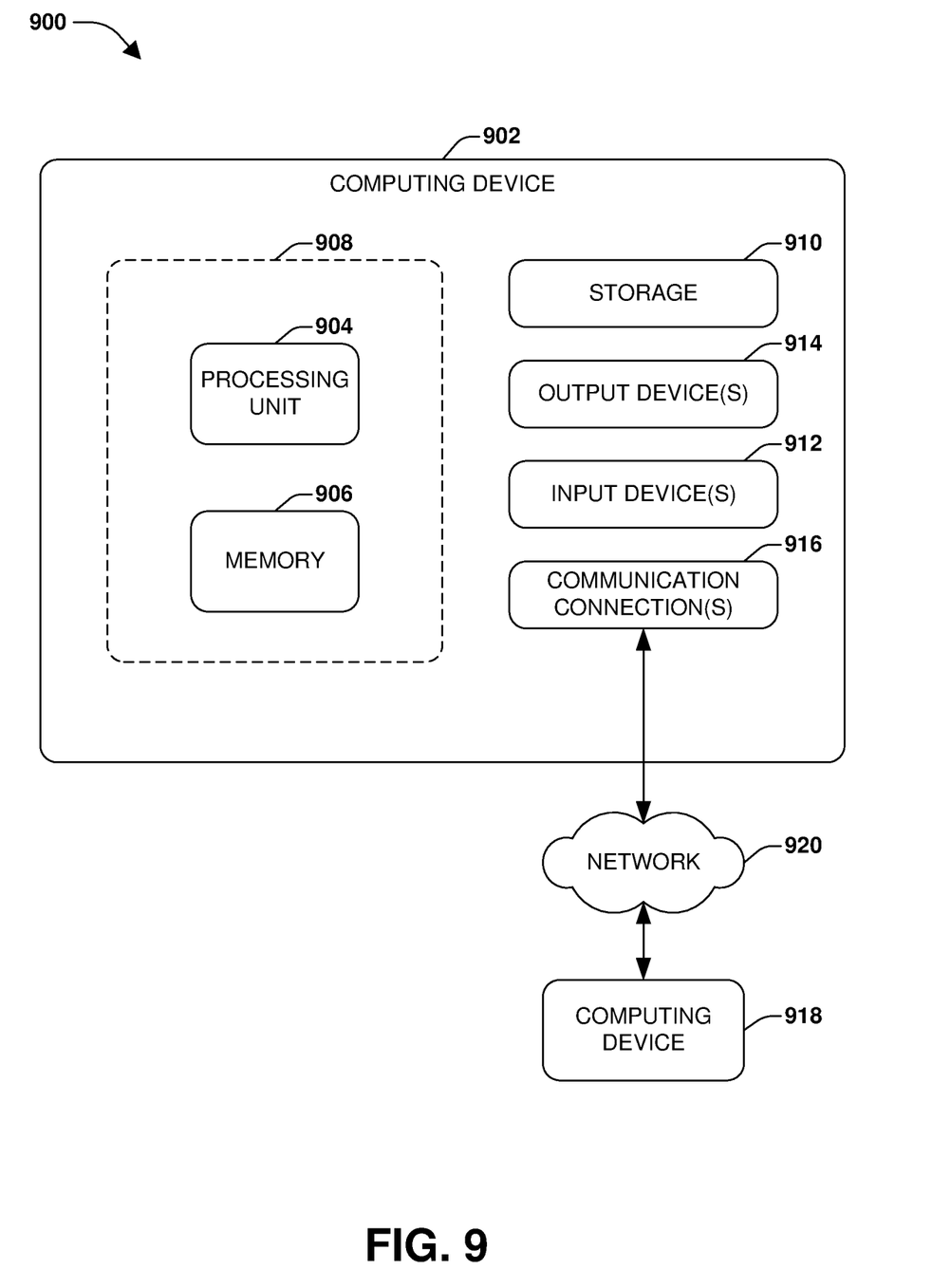
FIG. 9 illustrates an example, non-limiting computing environment where one or more of the aspects set forth herein are implemented, according to one or more embodiments.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 that may include a computing device 902 configured to implement one or more embodiments provided herein. In one configuration, the computing device 902 may include at least one processing unit 904 and at least one memory 906. Depending on the exact configuration and type of computing device, the at least one memory 906 may be volatile, such as RAM, non-volatile, such as ROM, flash memory, etc., or a combination thereof. This configuration is illustrated in FIG. 9 by dashed line 908.

In other embodiments, the device 902 may include additional features or functionality. For example, the device 902 may include additional storage such as removable storage or non-removable storage, including, but not limited to, magnetic storage, optical storage, etc. Such additional storage is illustrated in FIG. 9 by storage 910. In one or more embodiments, computer readable instructions to implement one or more embodiments provided herein are in the storage 910. The storage 910 may store other computer readable instructions to implement an operating system, an application program, etc. Computer readable instructions may be loaded in the at least one memory 906 for execution by the at least one processing unit 904, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 902 may include input device(s) 912 such as keyboard, mouse, pen, voice input device, touch input device, infrared cameras, video input devices, or any other input device. Output device(s) 914 such as one or more displays, speakers, printers, or any other output device may be included with the device 902. The input device(s) 912 and the output device(s) 914 may be connected to the device 902 via a wired connection, wireless connection, or any combination thereof. In one or more embodiments, an input device or an output device from another computing device may be used as the input device(s) 912 and/or the output device(s) 914 for the device 902. Further, the device 902 may include communication connection(s) 916 to facilitate communications with one or more other devices, illustrated as a computing device 918 coupled over a network 920.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
   a processor that executes the following computer executable components stored in a memory:
   a configuration component that determines a device type and browser type for a device attempting to access one or more applications features supported by the system;
   a mapping component that establishes a device/browser combination via cross-referencing the device type with the browser type; and
   a management component that maintains a listing of blocking groups and selectively performs functional blocking or uniform resource identifier based blocking as a function of the device/browser combination and the one or more applications or features attempting to be accessed; wherein the management component indicates whether a particular feature should be blocked or not blocked for a particular device, browser or device/browser combination.

2. The system of claim 1, wherein the management component alters at least one function for an application based on a rule associated with the functional blocking.

3. The system of claim 1, wherein the management component alters at least one function for an application based on a rule associated with the uniform resource identifier blocking.

4. The system of claim 1, wherein the management component allows access to at least one function for an application based on a rule associated with the functional blocking or the uniform resource identifier blocking.

5. The system of claim 1, wherein the management component blocks at least one function for an application based on a rule associated with the functional blocking or the uniform resource identifier blocking.

6. The system of claim 5, further comprising a communication component that outputs information related to the at least one function that is blocked.

7. The system of claim 1, wherein the device/browser combination is maintained in a relational database management system.

8. The system of claim 1, further comprising:
   a device type module that determines the device type based on information received from the device; and
   a browser type module that determines the browser type utilized by the device.

9. The system of claim 1, wherein each blocking group in the listing of blocking groups comprises a unique device/browser combination.

10. The system of claim 1, wherein the functional blocking blocks a defined functionality on the device/browser combination.

11. The system of claim 1, wherein the uniform resource identifier based blocking prevents access to a specific uniform locator.

12. A method, comprising:
   determining, by a system comprising a processor, a device/browser combination based on an indication that a device is attempting to access a resource;
   comparing, by the system, the device/browser combination to a database of device/browser combinations; and
   performing, by the system, one of the following:

allowing access to the resource based on a determination that the device/browser combination is not included in the database of device/browser combinations, or reconfiguring the resource based on a determination that the device/browser combination is included in the database of device/browser combinations, wherein reconfiguring the resource comprises blocking at least one feature of the resource independently.

13. The method of claim 12, wherein the reconfiguring the resource comprises altering at least one feature of the resource.

14. The method of claim 12, wherein the reconfiguring the resource comprises disabling at least one feature of the resource.

15. The method of claim 14, further comprising conveying, by the system, a notice to the device, wherein the notice comprises information related to the at least one feature.

16. The method of claim 12, wherein the reconfiguring the resource comprises blocking a defined functionality.

17. The method of claim 12, wherein the reconfiguring the resource comprises preventing access to a specific uniform locator.

18. A computer-readable storage device storing executable instructions that, in response to execution, cause a system comprising a processor to perform operations, comprising:

determining a device type and browser type for a device attempting to access one or more applications or features supported by the system;

establishing a combination based on a mapping between the device type and the browser type;

storing the combination in a database; and selectively performing blocking as a function of the combination and the one or more applications attempting to be accessed, wherein the selective blocking results in a subset of available functions being blocked independently.

19. The computer-readable storage device of claim 18, the operations further comprising blocking a defined functionality on the device/browser combination based on a selective functional blocking.

20. The computer-readable storage device of claim 18, the operations further comprising blocking access to a specific uniform locator based on a selective uniform resource identifier based blocking.

* * * * *